United States Patent

Mizumori et al.

[11] Patent Number: 6,139,745
[45] Date of Patent: *Oct. 31, 2000

[54] PURIFICATION APPARATUS

[75] Inventors: Takashi Mizumori, Nishiibaraki-gun; Koichi Tsuzuki, Tsuchiura; Junichi Kobayashi, Ushiku; Takeo Takagi, Tsukuba; Hiroaki Yoda, Tsuchiura; Kazuo Kobayashi, Chiba, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/860,244

[22] PCT Filed: Dec. 12, 1995

[86] PCT No.: PCT/JP95/02537

§ 371 Date: Jun. 13, 1997

§ 102(e) Date: Jun. 13, 1997

[87] PCT Pub. No.: WO96/18581

PCT Pub. Date: Jun. 20, 1996

[30] Foreign Application Priority Data

Dec. 13, 1994 [JP] Japan ..................................... 6-308658
Feb. 20, 1995 [JP] Japan ..................................... 7-30396

[51] Int. Cl.[7] ........................................................ C02F 1/74
[52] U.S. Cl. ........................... 210/617; 210/744; 210/747; 210/758; 210/807; 210/85; 210/143; 210/151; 210/170; 210/199; 210/242.1; 210/253; 210/255; 210/258
[58] Field of Search ................................. 210/617, 618, 210/661, 744, 747, 807, 85, 86, 143, 150, 151, 170, 242.1, 253, 258, 758, 199, 255

[56] References Cited

U.S. PATENT DOCUMENTS

| 444,007 | 1/1891 | Monjeau . | |
|---|---|---|---|
| 763,325 | 6/1904 | Roche | 210/242.1 |
| 4,422,929 | 12/1983 | Owens | 210/108 |
| 4,565,627 | 1/1986 | Lagström et al. | 210/242.1 |
| 4,582,609 | 4/1986 | Hunter et al. | 210/747 |
| 4,659,462 | 4/1987 | Chapman | 210/202 |
| 5,228,998 | 7/1993 | DiClemente et al. | 210/610 |
| 5,486,291 | 1/1996 | Todd et al. | 210/602 |

FOREIGN PATENT DOCUMENTS

| 62-74489 | 4/1987 | Japan . |
|---|---|---|
| 1-218691 | 8/1989 | Japan . |
| 6-99185 | 4/1994 | Japan . |

*Primary Examiner*—Peter A. Hruskoci
*Attorney, Agent, or Firm*—Evenson, McKeown, Edwards & Lenahan, P.L.L.C.

[57] ABSTRACT

A purification apparatus and method for enabling the purification of the lake and pond waters, is installed as a fluidized bed sewage system directly on the raw water area. The apparatus takes in the raw waters in the lake and pond and purifies the water. The purified water is fed back to the raw water area by the pump.

With this purification apparatus, the salt materials such as phosphate in the lakes, and the overall area of the waters can be purified while preventing the generation of phytoplanktons.

36 Claims, 6 Drawing Sheets

PURIFICATION APPARATUS

BACKGROUND AND SUMMARY OF THE INVENTION

The present invention relates to a purification apparatus and method for purifying directly the lakes and ponds in which the density of acid such as nitric and phosphoric due to gray water, animal uric acid sewage and sewage flowing into the lakes and ponds is adequately controlled.

In case of purifying the organic raw water in conventional systems a contact purification method uses biological films. Contact aeration process water treatment method is one of these purification methods. As for an actual implementation of contact aeration process water treatment method, what is well known conventionally is a multi-layered processing apparatus in which the processed water is forced to contact directly the contact media including aerobic microbes, and the purification process is achieved while the processed water running through the several multilayers developed from upstream to down stream. In an apparatus disclosed in Japanese Patent Open No. 62-74489 (1987), the contact aeration layer is buried under the ground apart from the polluted water site, and the multi-layered purification system is made not to be found on the ground.

As for other contact purification methods, what is often used is the submerged filter contact purification method, in which biological films are adhered on the filter media and the raw water is led to the filter media. In this method, two sub categories exist; in the fixed bed method, the contact media to which biological films adhere are fixed as the submerged filters, and on the other hand, in the fluidized bed method, the contact media with its specific gravity defined relatively larger than the specific gravity of water, for example, about 1.2, may be allowed to move freely in the processed water. As for the later category, the fluidized bed method, as disclosed in Japanese Patent Open No. 1-218691 (1990), there is such an example that the raw water with very high impurity density is purified by using the fluidized bed contact purification method accompanying with fresh air exposure. And as disclosed in Japanese Patent Open No. 6-99185 (1995), there is such an example that the raw water is purified by supplying the processed water mixed with the fresh air into the fluidized bed buries under ground.

If the purification facility is constructed in the shore or surrounding area of the lakes and ponds, and conventional purification method usually used in the sewage water treatment plant and/or the water purification plant is applied, a large amount of energy is required in addition to the minimum amount of energy to operate the purification facility. This is because the pressure loss occurs for transporting the raw water from the water intake port to the water treatment plant and because the pump work is required for transporting the raw water from the lake water level to the higher water level in which the water purification plant exists. In selecting the building site for the purification plant, a relatively small-scale sewage system can be built under ground. However, for purifying the lake and pond waters, it is required to treat larger amount of waters with lower impurity density than the sewage water treatment plant does. For the purification of lakes and ponds, the size of the sewage system becomes larger and it is difficult to locate the sewage system in the underground site, and therefore, there is such a problem that a building site for the purification facility can not be always selected to be at an optimal place.

If the sewage system is installed underground and the aeration process is required for injecting the chemical materials into the raw waters, there is not any sufficient way for preventing completely the flow-out of the filter media outside the facility to the lake waters.

An object of the present invention is to provide a purification apparatus operable with lower power.

Another object of the present invention is to provide a purification apparatus with which newly added systems can be integrated if necessary.

Yet another object of the present invention is to provide a purification apparatus which enables to control the density of impurities contained in the purified water.

Another object of the present invention is to provide a purification apparatus which operates water treatment efficiently for large amount of water in the lakes and ponds.

In order to achieve the above objectives, the purification apparatus of the present invention is so configured as to contain a water inlet port for in-taking water; a filter container in which filter media for purifying the process water taken in through the water inlet port are filled; and a pump for discharging the purified water processed by the filter media, in which the filter container in which the filter media is filled is placed inside the waters to which the purification operation is applied.

In the purification apparatus of the present invention, a fluidized bed filter container in which the filter media are filled and a pump are placed in the water to which the purification operation is applied, and the water level of the fluidized bed is so maintained to be lower than the water level of the waters to which the purification operation is applied by way of discharging the purified water in the upper part of the fluidized bed to the waters to which the purification operation is applied by the pump. The water flow from the water inlet port to the fluidized bed filter container can be established by the head pressure difference between the water level of the waters to be purified and the water level of the fluidized bed.

The purification apparatus of the present invention is placed in the waters area such as lakes ponds and oceans, and comprises a purification part for removing the pollution materials and/or specified materials contained in the waters to be purified; a water inlet part for taking in the raw water in the waters to be purified and forwarding the raw water to the purification part; a water discharge part for feeding back the purified water processed in the purification part; and a pump, in which the purification part is floating on the waters area to be purified and the purification part, the pump and the water discharge part are connected sequentially.

The purification apparatus of the present invention is placed in the waters area such as lakes ponds and oceans, and comprises a purification part for removing the pollution materials and/or specified materials contained in the waters to be purified; a water inlet part for taking in the raw water in the waters to be purified and forwarding the raw water to the purification part; a water discharge part for feeding back the purified water processed in the purification part; and a pump, in which the purification part is floating on the waters area to be purified and the purification part contains a fluidized bed filter system.

In addition, in the purification apparatus of the present invention, a float is placed in the filter container, and a wire and an anchor are used for stably fixing the filter container floating on the waters to be purified. A sand filter for catching the floating materials in the water is also placed between the water inlet port and the filter media. A reverse scrubbing mechanism is also included for refreshing the sand filter when blinding or clogging in the sand filter occurs. A solar panel and a battery storing electric power are also equipped in order to utilize the solar energy used for the electric power supplied to the pump. A control scheduler generates operation signals for the purification apparatus in order to establish the operation with respect to the predefined operation modes.

In order to achieve the above objectives, the purification apparatus of the present invention is so configured as to contain a water inlet port for taking in water; and a filter container assembled in a unit in which filter media for purifying the process water taken in through the water inlet port are filled, in which a plurality of filter containers, each assembled in an individually separated unit, are connected to the water inlet ports.

The purification apparatus of the present invention is so configured as to contain a water inlet port for taking in water; a filter container in which filter media for purifying the process water taken in through the water inlet port are filled; and a pump for discharging the purified water processed by the filter media, in which the water intake port and the water discharge port for discharging the purified water are formed in the horizontal direction, and the water inlet port and the water discharge ports are connected to each other.

In the purification apparatus of the present invention, the private sewage system is comprised of at least two or more units, and unit connectors between units are also provided. In addition, the purification apparatus has apparatus for judging the abnormal status of the operation of the pump; and an abnormal signal generator for generating an abnormal signal when any abnormal status is detected by the judgment means.

In order to achieve another object, a lake purification apparatus of the present invention, placed in the water area such as lakes, rivers and oceans, comprises a purification part for removing the pollution materials and/or specified materials contained in the waters to be purified; a water inlet part for taking in the raw water in the waters to be purified and forwarding the raw water to the purification part; a water discharge part for feeding back the purified water processed in the purification part; and a pump, in which the purification apparatus is floating on the water area to be purified, and the discharged water from the water discharge port is so operated as to reach the area far from the water inlet port and to satisfy the following relationship, $N2<N0$, $N2<N1$, and $(N1-N2)/(N0-N2)>0.95$, where $N0$ is the average density of the target material to be removed by the purification apparatus and contained in the water of the water area to be purified;

$N1$ is the density of the target material to be removed and contained in the water taken in from the water inlet part of the purification apparatus; and $N2$ is the density of the target materials contained in the water discharged from the water discharge part.

In order to achieve yet another object, a lake purification apparatus of the present invention, placed in the water area such as lakes, rivers and oceans, comprises a purification part for removing the pollution materials and/or specified materials contained in the waters to be purified; a water inlet part for taking in the raw water in the waters to be purified and forwarding the raw water to the purification part; a water discharge part for feeding back the purified water processed in the purification part; and a pump, in which the purification apparatus is floating on the water area to be purified, and the purification part is so assembled with a plurality of individually separated sewage systems, a water path is so formed that the water taken in from the water inlet part may be sequentially supplied to the plurality of sewage systems in series, and the final stage of the downstream of the water path connects to the water discharge part.

The purification apparatus of the present invention comprises a purification part for removing the pollution materials and/or specified materials contained in the waters to be purified; a water inlet part for taking in the raw water in the waters to be purified and forwarding the raw water to the purification part; a water discharge part for feeding back the purified water processed in the purification part; and a pump, in which the purification apparatus is floating on the water area to be purified, and the purification part is so assembled with a plurality of individually separated sewage systems, a water path is so formed that the water taken in from the water inlet part may be sequentially supplied to the plurality of sewage systems in series, and the final stage of the downstream of the water path connects to the water discharge part. In purifying the waters in lakes and ponds, it is necessary to treat large amount of water with its density lower, and therefore, it is necessary to reduce the process loss as much as possible with an adequate layout of sewage systems by shortening the distance between the water treatment plant and the inlet port of the raw water. With this configuration, in order to consider the water level changes due to rain and water discharge, the sewage system floating on the water can be fixed in a definite position with a float and an anchor mounted on the sewage system, which leads to the shorter distance between the water inlet port and the sewage system and the lower process loss in transporting the water between them. In addition, as the wider area on the water surface can be efficiently used, a unit of the water inlet port and the sewage system can be located in a designated position for which the water purification is required among the whole waters areas.

The filtered materials captured in the filter is led to the filtered material reservoir by opening the reverse scrubbing valve.

Owing to the above described configuration, the components of the apparatus can be replaced by parts when maintenance work is required, and the number of the sewage systems to be installed initially and their combination can be arranged conditionally according to the allowable initial investment. In addition, the necessary additional systems may be allowed. As the number of units to be deployed can be adjusted according to the area size of the waters to be purified, a mass production of units is made possible and the cost merits with more inexpensive fabrication cost than an integrated model can be achieved.

In addition to the reduction of the fabrication cost, the density of impurities contained in the purified water to be discharged finally can be controlled by determining an optimal number of sewage systems.

And furthermore, by making the sewage system float on the waters, the effect of the water level changes can be reconciled. If the distance between the water inlet part and the water discharge part is set to be large enough and the feedback ratio of the purified water from the water discharge part to the water inlet part is controlled so as to be less than 5%, the designated generic performance of the sewage system can be achieved without making the scale size of the sewage system larger. In this case, as at least one part of the fluidized bed purification apparatus is exposed above the water level, a new water surface is formed between the apparatus and the water area to be purified. Thus, as for the flowing out of the filter media, the filter media do not contact directly to the water area, the risk of the flowing out of the filter media may be estimated to be lower than the case in which the sewage system is placed below the water surface.

As the waters to be processed is forced to be exposed to the water surface before entering the fluidized bed and the waters are naturally exposed to the air, it is preferable for the biological process for the aerobic microbe in the fluidized bed. In addition, if the depth of water is shallow, the exposure effect can be brought by the tank installed at the preliminary stage of the fluidized bed, and what is expected is such an effect that the pressure head difference between the water level of the waters to be purified and the water level of the water at the upper part of the fluidized bed can be made larger. By arranging the fluidized beds in series, there is another effect that the duration time for the waters to contact the air in the fluidized bed can be sufficiently larger to obtain a designated effect.

BRIEF DESCRIPTION OF DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
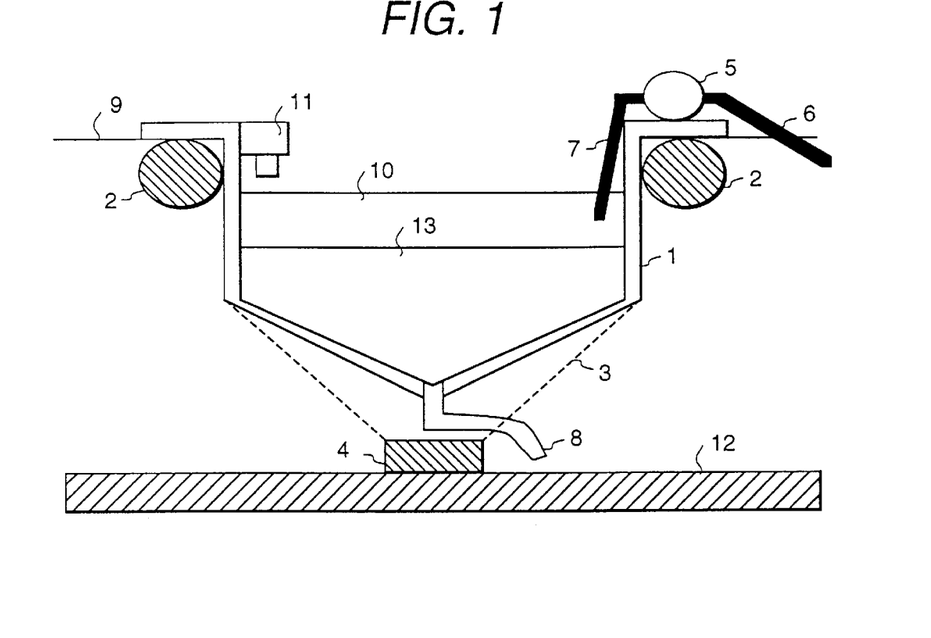
FIG. 1 is a vertical cross section of the purification apparatus in one embodiment of the present invention.

As shown in FIG. 1, the purification apparatus for purifying the lake water in this embodiment comprises the following main components; a fluidized bed container 1 filled with fluidized bed filter media 13, a water intake tube 8 for leading the raw water into the fluidized bed container 1, a float 2 for floating the fluidized bed container 1, a wire 3 for fixing the fluidized bed container 1 with the anchor 4 mounted on the lake bottom 12, a water level sensor 11 for observing the water level 10 of the upper surface of the fluidized bed, a pump 5 for taking the purified water contained in the fluidized bed container 1 by the suction pipe 7, and a drainage (or discharge) pipe 6.

The length of the wire 3 is selected to be longer, so that the position of the fluidized bed container 1 relative to the water surface is kept constant even if the water level of the lake may change. The purified water is taken in through the suction pipe 7 by the pump 5, and is discharged out to the waters to be purified by the drainage pipe 6. The water level 10 of the upper surface of the fluidized bed is observed by the water level sensor 11, and the pump 5 is so controlled that the water level 10 may be kept to be lower a designated value than the water level 9 of the waters to be purified. Owing to the water level difference between the water level 9 of the waters to be purified and the water level 10 of the upper surface of the fluidized bed, the raw water is flowing through the water intake pipe 8 into the fluidized bed container where the water purification operation is achieved with the fluidized bed filter media 13. A stationary operation of the purification apparatus is established when the water level difference and the fluid path resistance when the raw water passes through the filter media are balanced. With this configuration, the necessary power for operating the purification apparatus is smaller without preparing the pressure container in the purification apparatus system, and therefore, an unmanned operation can be achieved safely with solar cells for the electric power supply.

Figure 2:
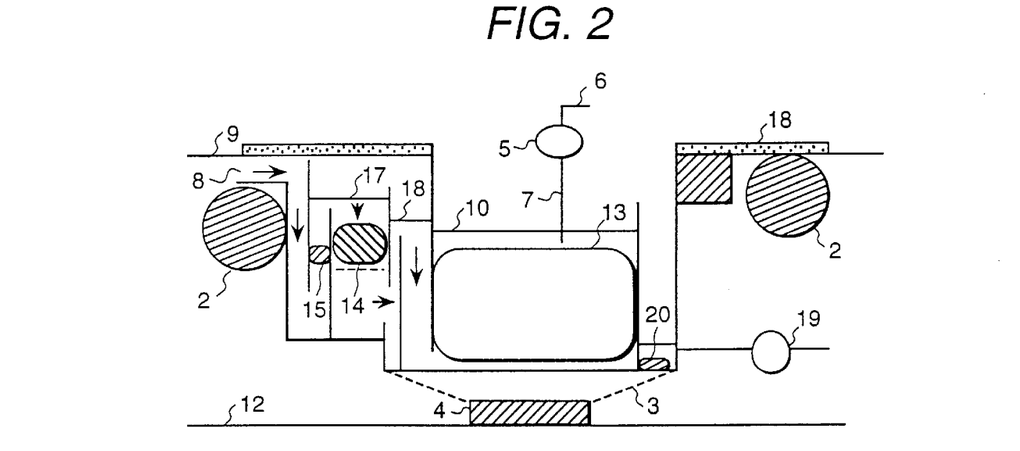
FIG. 2 is a vertical cross section of the purification apparatus in another embodiment of the present invention.

As shown in FIG. 2, in the purification apparatus for the lake water in this embodiment, the sewage system is located in a definite position in the lake waters with the float 2, the wire 3 and the anchor 4. As the sewage system is floating on the water surface with the float 2, the sewage system moves up and down in response to the changes in the water level 9 of the lake waters, and the water intake port 8 is kept in a constant position relative to the water level 9 of the lake waters. In this embodiment, there are four categories of water levels defined inside the sewage system; the water level 9 of the lake waters, the first water level 17, the second water level 18 and the water level 10 of the upper surface of the fluidized bed. At first, the raw water of the lake waters is taken in through the control valve 15 owing to the pressure head difference between the water level 9 of the lake waters and the first water level 17. Next, the intake raw water is lead through the sand filter 14 into the lower end part of the fluidized bed filter media 13 due to the pressure head difference between the first water level 17 and the second water level 18. In this second stage, the processed water captures oxygen due to the air exposure effect on the water surface of the second water level, 18 in which the air and the water forming a liquid-vapor interface interact each other. In addition, the injection of chemical additives in the second water level 16 gives very effective mixture of waters and chemical additives. If the sand filter 14 is blocked and the pressure loss increases, the first water level 17 comes close to the water level 9 of the lake waters and become equal to the second water level 18 due to overflow. Thus, in case that the sand filter 14 fails to operate normally, even if the sand filter 14 suffers from blocking, the operation of the sewage system can be continued as the processed water bypasses the sand filter 14, and overflows and comes into the lower part of the fluidized bed filter media 13. The processed water purified by the fluidized bed filter media 13 is taken through the suction pipe 7 by the pump 5 and discharged to the lake through the water discharge pipe 6.

Thus, as the raw water can be purified while the head pressure difference can be made smaller, as for the electric power, a solar panel 18 can be used for generating electric power for driving the pump 5. When sludge is stacked near the water level 10 of the upper surface of the fluidized bed, the water level 10 of the upper surface of the fluidized bed can be increased by stopping the pump 5, and the sludge flowing over into the sludge reservoir 20 can be extracted out by the sludge extraction pump 19. In this embodiment, the speed of the flow of the processed water passing through the fluidized bed filter media 13 is estimated to be about 1 mm/sec, and the designated unit of the processed water passes through the fluidized bed filter media 13.

Figure 3:
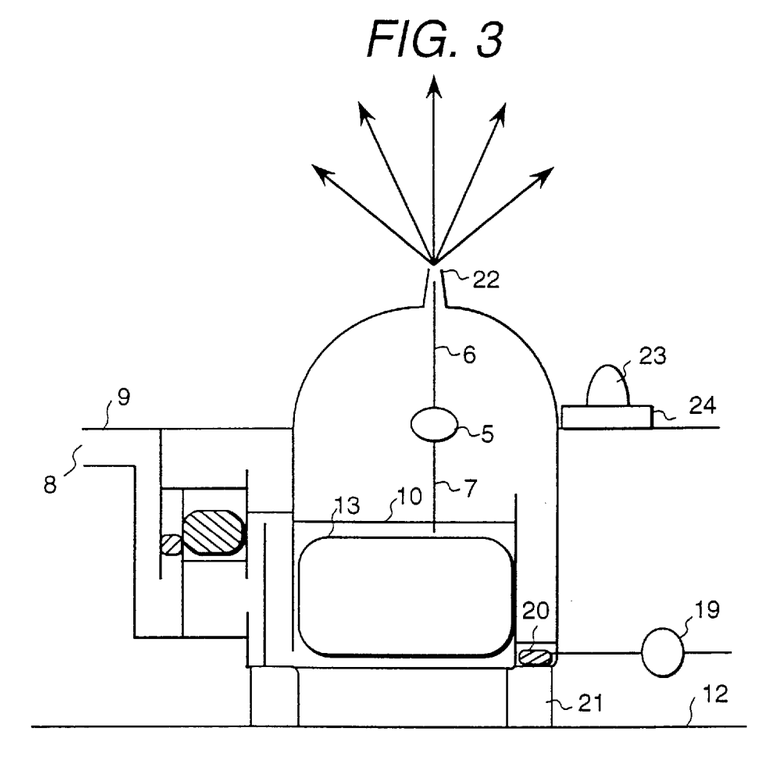
FIG. 3 is a vertical cross section of the purification apparatus in another embodiment of the present invention.

As shown in FIG. 3, the purification apparatus for the lake waters in this embodiment is so configured as same as the embodiment shown in FIG. 2, in which the sewage system is fixed in the bottom of the lake by the fixing member 21. The water is led through the water intake port 8 mounted near the water surface 9 of the lake waters to the lower part of the fluidized bed filter media 13, which is driven by the pressure head difference between the water level 9 of the lake water and the water level 10 of the upper surface of the fluidized bed. In this embodiment, the purified water is taken through the suction pipe 7 by the pump 5, and is discharged through the water discharge pipe 6 to the lake water. The discharged water is spread out from the nozzle 22 like a fountain. When the pump 5 is forcibly stopped, the water level 10 of the upper surface of the fluidized bed increases and overflows, and then, the sludge stocked in the fluidized bed reservoir moves to the sludge reservoir 20 and can be extracted out by the sludge extraction pump 19. In case that the abnormal state in the operational conditions of the pump 5 is detected, the alarm lamp 23 is blinked, and the abnormal message signal reporting the existence of the abnormal state is sent to the facility management office by the communication system.

Figure 4:
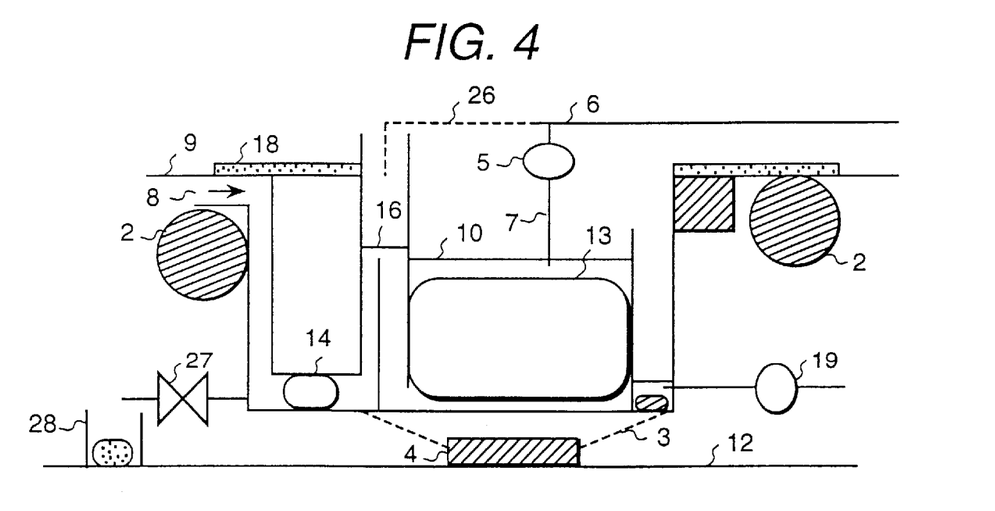
FIG. 4 is a vertical cross section of the purification apparatus in another embodiment of the present invention.

The purification apparatus for the lake waters in the embodiment of FIG. 4 is configured the same as the embodiment shown in FIG. 2, in which the sewage system is located in a definite position in the lake waters with the float 2, the wire 3 and the anchor 4. As the sewage system is floating on the water surface with the float 2, the sewage system moves up and down responsive to the changes in the water level 9 of the lake waters, and the water intake port 8 is kept in a constant position relative to the water level 9 of the lake waters. The water is led through the water intake port 8 mounted near the water surface 9 of the lake waters to the lower part of the fluidized bed filter media 13, which is driven by the pressure head difference between the water level 9 of the lake water and the water level 10 of the upper surface of the fluidized bed. The purified water is taken through the suction pipe 7 by the pump 5, and is discharged through the water discharge pipe 6 to the lake water. A solar panel 18 is used for the power source of the pump 5, and the excess electric power is charged into a battery. The stored electric power is used for the night-time electric power, and thus, the sewage system can be operated in an operation mode which is never subject to sun light exposure conditions. In this embodiment, the sand filter 14 is placed in the vertical direction. If the sand filter 14 suffers from blockage, the purified water to be discharged outside through the water discharge pipe 6 is fed back through the reverse scrubbing discharge pipe 26 for the internal usage as the reverse scrubbing operation in order to increase the second water level 16. With this reverse scrubbing operation, the second water level 16 becomes higher than the water level 9 of the lake water, and the water flow current in reverse direction occurs in the sand filter 14, with which the sand filter can be scrubbed. As a result, the filtered materials captured in the sand filter can be trapped into the filtered material reservoir 28 by opening the reverse scrubbing valve 27.

Figure 5:
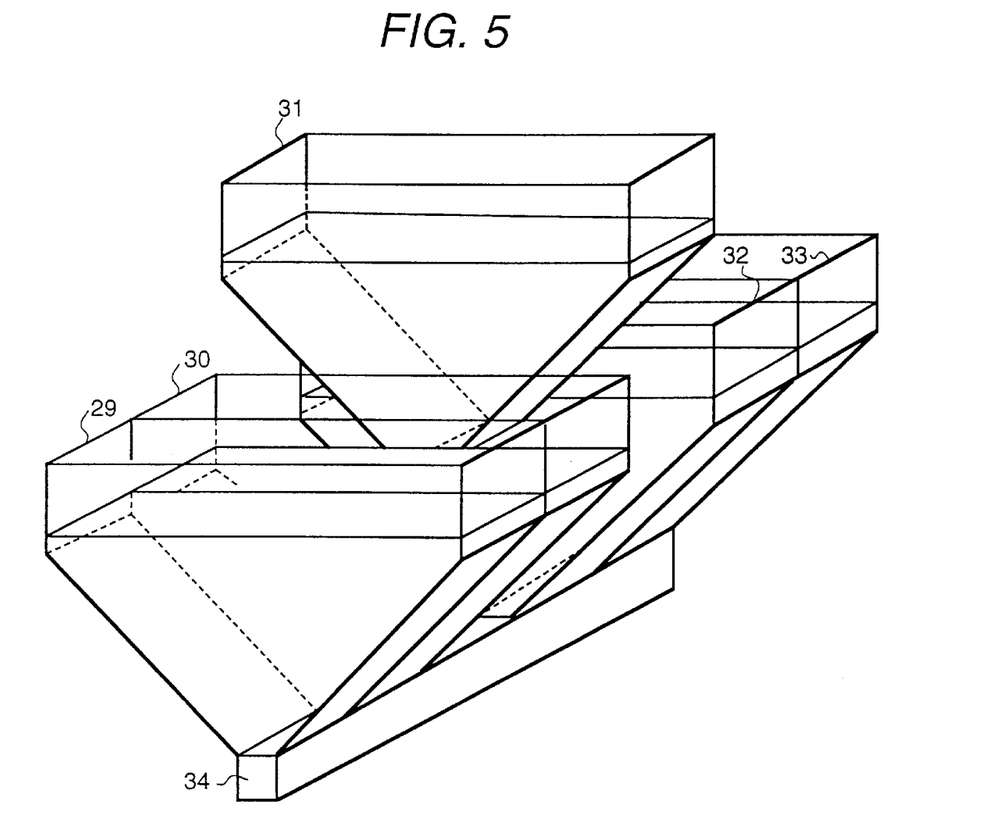
FIG. 5 is a isometric view of the purification apparatus in another embodiment of the present invention.

The fluidized bed sewage system of the embodiment of FIG. 5 is composed of several individual units. In FIG. 5, the sewage system is composed of six separate units; the first unit 29, the second unit 30, the third unit 31, the fourth unit 32 and the fifth unit 33. As like in the third unit 31, the individual unit is composed of fluidized bed contact filter media and a container. The lower end of the individual unit connects to the common water intake port 34, from which the raw water is taken in, and the purified water is discharged from the upper part of the individual unit. Thus, as the sewage system is composed of several separate units, the designated unit can be replaced partially for the maintenance work, and the number of the units to be installed initially and their combination can be arranged conditionally according to the allowable initial investment. In addition, the necessary additional systems may be allowed. As the number of units to be deployed can be adjusted according to the area size of the waters to be purified, a mass production of units more inexpensive fabrication cost than an integrated model can be achieved.

Figure 6:
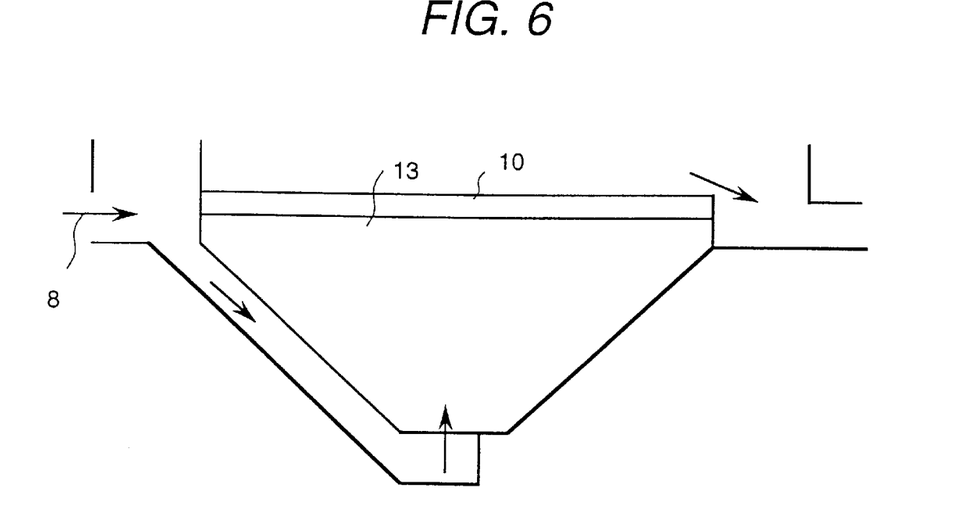
FIG. 6 is a vertical view of the purification apparatus in another embodiment of the present invention.
Figure 7:
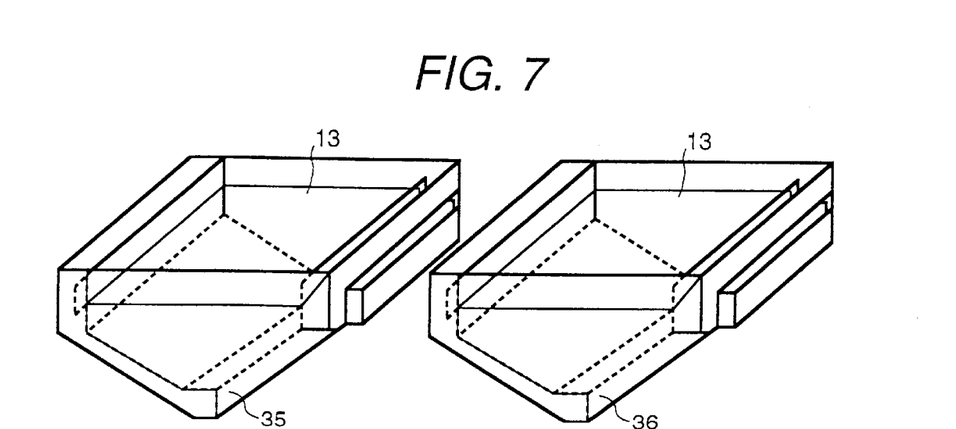
FIG. 7 is an isometric view of the purification apparatus shown in FIG. 6.

If an attempt is made to install the fluidized bed purification apparatus directly in the waters, there is no problem when the lake water is sufficiently deep. However, in shallow lake waters, as the depth of the fluidized bed can not be taken to be larger enough, and as the duration time for the contact operation between the raw water and the filter media is rather short, the expected purification effect can not be attained. As shown in FIGS. 6 and 7, the lake water purification apparatus has a multistage configuration including a plurality of fluidized bed purification systems arranged in a horizontal direction. Owing to the configuration in this embodiment, the duration time for the contact operation between the raw water and the filter media can be taken to be long enough in proportional to the number of connected purification systems. The raw water comes into the first sewage system from the left side shown in FIGS. 6 and 7, and is led to the lower part of the fluidized bed filter media 13. The purified water moves upward to the upper surface of the fluidized bed filter media 13 and is led to the water intake port to the second sewage system 36, where the purification operation similar to the first sewage system is undertaken, and finally, the purified water is discharged to the right side shown in FIGS. 6 and 7. In this apparatus, the individual sewage systems are formed in an identical shape, which leads to the reduction of fabrication cost as well as establishes the optimal control of the density of impurities contained in the purified water obtained finally by selecting the optimal stage numbers of sewage systems.

Figure 8:
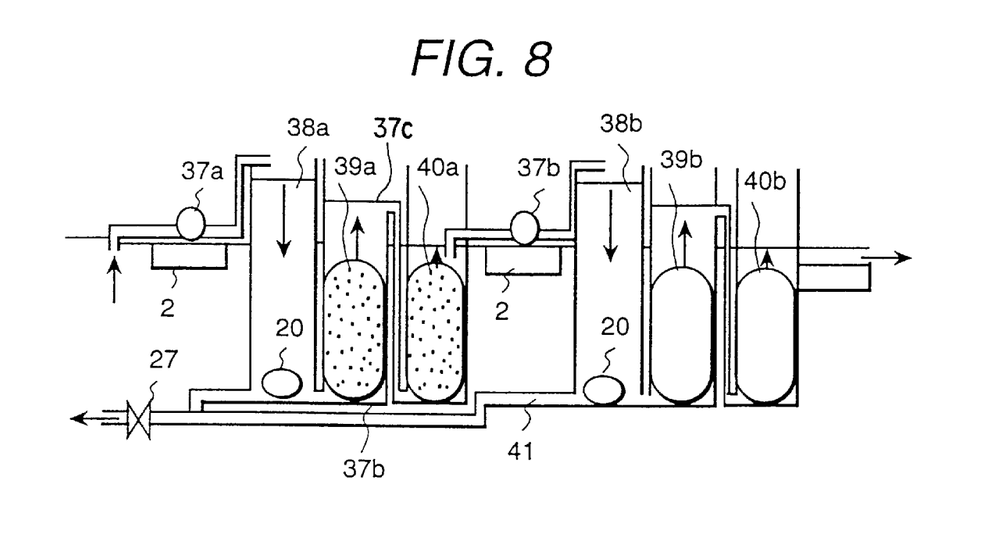
FIG. 8 is a vertical cross section of the purification apparatus in another embodiment of the present invention.

As shown in FIG. 8, the raw water to be processed is transported by the first pump 37a and reaches the first tank 38a. As the upper surface of the first tank 38a contacts the fresh air directly, the resolved oxygen content in the water to be processed increases by the water surface being exposed directly to the oxygen in the fresh air. While the processed water travels to the upper part of the first fluidized bed 39a connected to the lower part of the first tank 38a, the nutrient salt such as phosphate is removed from the water in the fluidized bed 39a. The processed water reaching the upper part of the first fluidized bed 39a goes through the water path 37c, and reaches the lower part of the second fluidized bed 40a.

The water discharge power of the second pump 37b is so controlled that the water levels may decrease in order from the water level of the first tank 38a, and the water level of the first fluidized bed 39a to the water level of the second fluidized bed 40a, and that the water level of the second fluidized bed 40a may be almost equal to the water level of the lake water to be purified. In addition, the water level of the processed water is raised up to the upper part of the second tank 38b by the second pump 37b. The processed water entering the second tank 38b is forced to travel through the third fluidized bed 39b and the fourth fluidized bed 40b, and is finally discharged outside the purification apparatus. In this operation, by making the speed of the flow of water discharged at the startup of the apparatus faster than the speed of the flow of the water taken into the apparatus, the shortcut flow on the lake waters between the water intake part and the water discharge part can be prevented and thus, the reduction of the purification performance of the apparatus due to the shortcut flow can be avoided. In addition, the operation for increasing the speed of the flow of water discharged at the startup of the apparatus to be faster than the speed of the flow of the water taken into the apparatus can be performed in the stationary operation of the purification apparatus if necessary. The sludge stacked in the bottom of the tank and the sludge reservoir 20 can be discharged though the sludge extraction pipe 41 by the reverse scrubbing operation including opening the reverse scrubbing valve 27.

In this embodiment, the power of the pump is determined so that the total amount of waters processed by the purification apparatus in 10 days may cover the total amount of raw waters contained in the lake waters. In this embodiment, four stages of fluidized beds made of resin materials are defined, in which designated water level differences are established by controlling a couple of pumps. Thus, owing to the configuration of plurality stages of fluidized beds, the purification apparatus can be easily transported to the installation site on the lake water. In addition, by making the shape of the individual fluidized bed almost identical to one another, the reduction of fabrication cost can be attained.

Figure 9:
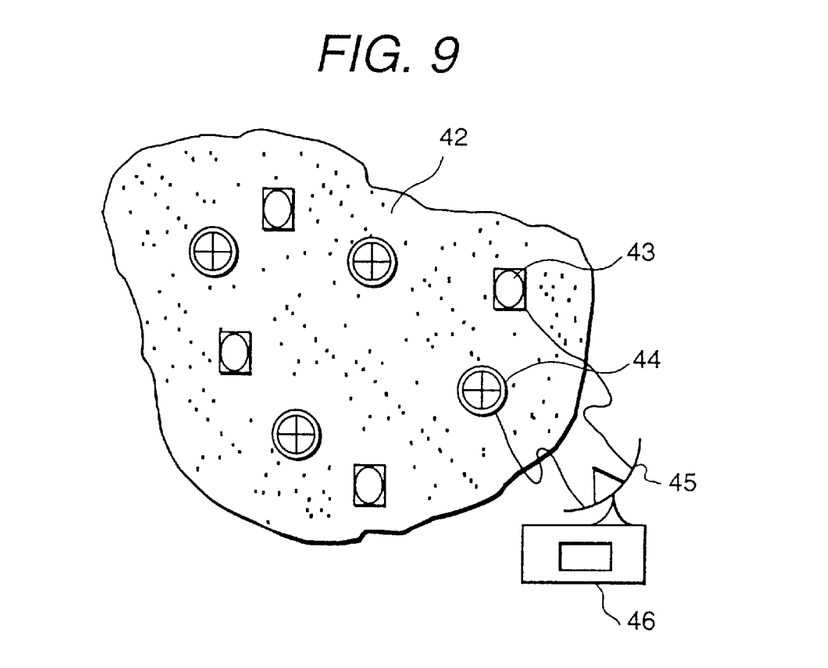
FIG. 9 is a plan view of the lake on which the purification apparatus in one embodiment is floating.

As shown in FIG. 9, a plurality of purification apparatus shown in any of FIGS. 1 to 7 are installed in the lake water 42. As shown in FIG. 9, the observation apparatus 43 for observing the specified water quality is installed in the lake water 42, and the water quality information of the lake water is transmitted via wireless communication from the observation apparatus 43 and is received by the antenna 45 of the control room 46. The water quality information is analyzed in the control room 46, and the operation mode of plural purification apparatus and/or the operation status are determined and sent back to the purification apparatus 44. By repeating this observation and control operation, it will be appreciated that the ineffective operation of the purification apparatus can be eliminated and that the running cost of the purification apparatus can be reduced.

Figure 10:
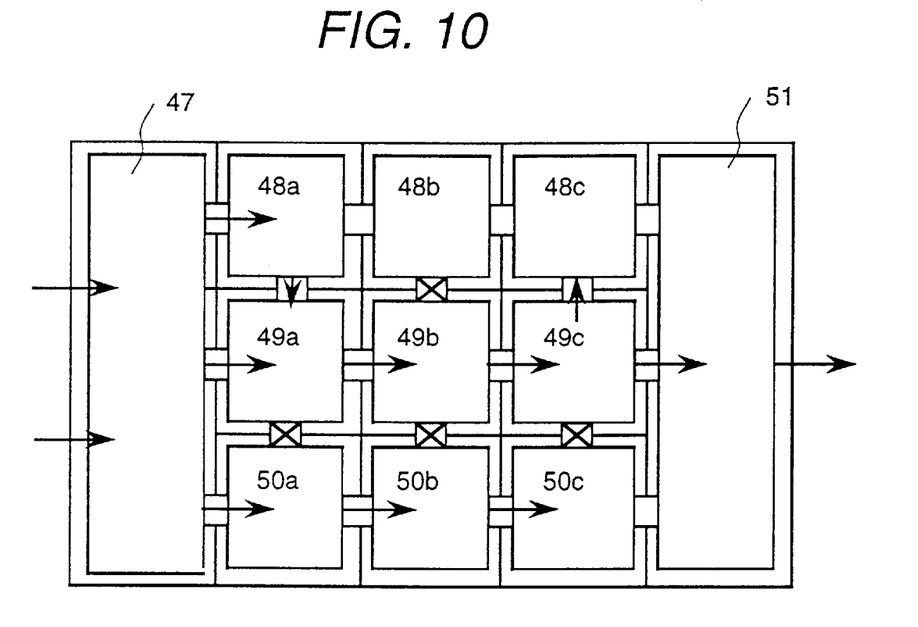
FIG. 10 is a plan view of the purification apparatus in another embodiment of the present invention.

As shown in FIG. 10, in the purification apparatus for the lake water in this embodiment, on the water path from the water intake part 47 along to the water discharge part 51, nine units of sewage systems 48a, 48b, 48c, 49a, 49b, 49c, 50a, 50b and 50c, in which the individual sets of sewage systems, (48a, 48b, 48c), (49a, 49b, 49c) and (50a, 50b, 50c), are arranged in series. In the following couples of sewage systems, the processed water can be exchanged and separated freely by the open-close shutters 48a, 49a; 48b, 49b; 48c, 49c; 49a, 50a; 49b, 50b; and 49c, 50c.

Owing to the configuration shown in FIG. 10, even if, for example, the sewage system 48b fails to operate normally and is required to be closed under any circumstance, the water path between the sewage systems 48a and 48b and the water path between the sewage systems 48b and 48c are closed, so that the processed water flow can be established from 48a via 49a, 49b, 49c to 49c in series while the sewage system 48b is bypassed. Thus, even if any of sewage systems fails to operate normally, another sewage systems operating normally can continue to purify the processed water substantially.

As described above, according to the purification apparatus of the present invention, the power loss due to the transportation of raw waters from the water area to the purification apparatus site can be reduced by locating the purification apparatus directly on the water area. In addition, an effective usage of the water area can be achieved, with which the optimal position in the water area can be selected for locating the sewage systems which can be operated with lower energy, which leads ultimately to the maximum effect for operating the purification apparatus. With this configuration, in order to consider the water level changes due to rain and water discharge, the sewage system floating on the water can be fixed in a definite position with a float and an anchor mounted on the sewage system, which leads to the shorter distance between the water inlet port and the sewage system and the lower process loss in transporting the water between them.

The filtered materials captured in the filter are led to the filtered material reservoir by opening the reverse scrubbing valve, and thus, the filtered material captured in the filter can be washed out.

Owing to the above described configuration, the components of the apparatus can be replaced with new parts when maintenance work is required, and the number of the sewage systems to be installed initially and their combination can be arranged conditionally according to the allowable initial investment. In addition, any necessary additional systems may be allowed. As the number of units to be deployed can be adjusted according to the area size of the waters to be purified, a mass production of units and more inexpensive fabrication cost than obtainable with an integrated model can be achieved.

In addition to the reduction of the fabrication cost, the density of impurities contained in the purified water to be discharged finally can be controlled by determining an optimal number of sewage systems.

As the level of one part of the fluidized bed purification apparatus is defined to be higher than the water level of the lake water, the risk of the flowing out of the filter media may be estimated to be lower than the case in which the sewage system is placed below the water surface. As the sewage system is so configured as that the water surface and the fresh air may contact each other, the density of the dissolved oxygen in the water is increased which is preferable for the biological process for the aerobic microbe in the fluidized bed. By installing a tank at the preliminary stage of the fluidized bed, the purification apparatus can be operated even with a shallow depth of the lake water. By forming the fluidized beds in multi stages, the duration time for the purification process is not subject to the depth of the lake water, and the expected effect of the purification operation can be attained to a reasonable extent.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A purification apparatus comprising:
   a water intake port for taking in water;
   a filter container in which filter media for purifying a process water taken in through said water intake port are filled, said filter container being placed inside a water area to which a purification operation is applied;
   a pump disposed downstream of said filter container for discharging purified water from said filter container;
   means disposed between said filter container and said said water intake port having an upper water surface for exposing a water flow from said water intake port to fresh air;
   means for exposing said water flow to the fresh air at said upper water surface to increase oxygen of said water flow; and means for introducing said water flow into said filter container.

2. A purification apparatus of claim 1, having a float in said filter container, and a wire and an anchor for fixing said filter container, wherein said filter container is floating on an area to be purified.

3. A purification apparatus of claim 1, wherein a sand filter for catching a floating material in a water is also placed between said water inlet port and filter media.

4. A purification apparatus of claim 3, further comprising a reverse scrubbing mechanism for refreshing said sand filter when blinding occurs in said filter.

5. A purification apparatus of claim 1, wherein said filter container is separated into at least two individual units, and a unit connection apparatus is operatively arranged between said individual units.

6. A purification apparatus of claim 1, further comprising a solar panel and a battery storing electric power in order to utilize solar energy used for an electric power supplied to said pump.

7. A purification apparatus of claim 1, further comprising a control schedule means for generating operation signals for said purification apparatus in order to establish an operation with respect to a pre-defined operation mode.

8. A purification apparatus of claim 1, further comprising means for judging an abnormal status of an operation of said pump; and an abnormal signal generation means for generating an abnormal signal when any abnormal status is detected by said means for judging.

9. A purification apparatus comprising:
a water intake port for taking in water;
a fluidized bed filter container filled with a filter media and a pump placed in a water area downstream of the filter container to which a purification operation is applied for discharging purified water from said filter container;
means disposed between said fluidized bed filter container and said water intake port having an upper water surface exposed to fresh air for exposing water flow-there across to fresh air,
means for exposing said water flow to the fresh air at said upper water surface to increase the oxygen content of said water flow;
means for maintaining a water level of said fluidized bed filter container to be lower than said upper water surface; and
means for establishing a water flow from said water intake port to said fluidized bed filter container by a head pressure difference between said upper water surface and a water level of said fluidized bed filter container.

10. A purification apparatus of claim 9, having a float in said filter container, and a wire and an anchor for fixing said filter container, wherein said filter container is floating on an area to be purified.

11. A purification apparatus of claim 9, wherein a sand filter for catching a floating material in a water is also placed between said water inlet port and filter media.

12. A purification apparatus of claim 9, wherein said purification apparatus is separated into at least two series-connected units; and a unit connection apparatus is placed between said units.

13. A purification apparatus of claim 9, further comprising a solar panel and a battery storing electric power in order to utilize solar energy used for an electric power supplied to said pump.

14. A purification apparatus of claim 9, further comprising a control schedule means for generating operation signals for said purification apparatus in order to establish an operation with respect to a pre-defined operation mode.

15. A purification apparatus of claim 9, further comprising means for judging an abnormal status of an operation of said pump; and an abnormal signal generation means for generating an abnormal signal when any abnormal status is detected by said means for judging.

16. A purification apparatus for placement in a water area to be purified, comprising:
a purification device for removing at least one of a pollution material and specified material contained in said water area to be purified, said purification device being arranged to float on said water area to be purified;
a water inlet port for taking in raw water in said water area to be purified and forwarding said raw water to said purification device;
a water discharge port for feeding back said purified water processed in said purification device;
a pump located downstream of said purification device for discharging purified water from said purification device to said discharge port;
means disposed between said purification device and said water inlet port having an upper water surface for exposing to fresh air raw water flow to be fed to said water inlet port;
means for exposing said water flow to the fresh air at said upper water surface to increase oxygen content of said water flow; and means for introducing said water flow into said purification device.

17. A purification apparatus of claim 16, wherein said purification device includes a fluidized bed filter tank.

18. A purification apparatus of claim 17, wherein an air layer contacting directly to an air on a water surface of said water area is defined at an upper part of said fluidized bed filter tank.

19. A purification apparatus of claim 16, further comprising a group of purification parts defined as said plurality of purification parts linked together on plurality water paths arranged in series, wherein said group of said purification parts share an identical water intake part or an identical water discharge part.

20. A purification apparatus of claim 19, further comprising a water path formed in parallel and connecting together said group of plural purification parts, wherein when a part of said water path defined in series is blocked, any of said water path formed in parallel is selected for navigating a water flow to a designated water path defined in series.

21. A purification apparatus of claim 16, wherein a part of electric power used in said pump is an electric power generated by solar light electric generation.

22. A purification apparatus for placement in a water area to be purified, comprising:
a purification device for removing at least one of a pollution material and a specified material contained in said water area to be purified and arranged on said water area to be purified, said purification device being separated into a plurality of independent purification tanks, and a water path being so formed that raw water from said water area is transported through said plurality of purification tanks;
a water inlet port for taking in the raw water in said water area to be purified and forwarding said raw water to said purification device;
a water discharge port for feeding back said purified water processed in a final stage of said purification device downstream of said water path;
a pump located downstream of the purification device for discharging purified water from said purification device to said discharge port;
means disposed between said water inlet port and said purification device for exposing to fresh air an upper surface of water flow from said water inlet port toward said purification device to increase oxygen content of said water flow; and means for introducing said water flow into said purification device.

23. A purification apparatus of claim 22, wherein said purification device comprises a group of purification parts linked together in series-arranged water paths and sharing an identical water intake or an identical water discharge.

24. A purification apparatus of claim 22, wherein a part of electric power used in said pump is an electric power generated by solar light electric generation.

25. A purification apparatus for placement in a water area to be purified, comprising:
a purification device for removing at least one of a pollution material and a specified material contained in said water area to be purified, said purification device being floated on said water area to be purified and comprising a series of independent purification tanks defining a water path such that raw water from said water area is transported sequentially to said purification tanks;

a water inlet port for taking in said raw water in said water area to be purified and forwarding said raw water to said purification device;

a water discharge port for feeding back said purified water processed in a last purification tank of said purification device;

a pump located downstream of said purification device for discharging purified water from said purification device to said discharge port;

means disposed between said purification device and said water inlet port to expose to fresh air an upper surface of water flow from said water inlet port toward said purification device to increase oxygen content of said flow; and means for introducing said water flow into said purification device.

26. A purification apparatus of claim 25, wherein said purification device comprises a group of purification parts linked together in series-arranged water paths and sharing an identical water intake or an identical water discharge.

27. A purification apparatus of claim 25, wherein a part of electric power used in said pump is an electric power generated by solar light electric generation.

28. A purification apparatus for placement in a water area to be purified, comprising:

a purification device for removing at least one of a pollution material and a specified material contained in said water area to be purified, said purification device being formed with a fluidized bed filter tank and being configured to float on said water area to be purified;

a water inlet port for taking in a raw water in said water area to be purified and forwarding said raw water to said purification device;

a water discharge port for feeding back said purified water processed in said purification device;

a pump located downstream of said purification device for discharging purified water from said purification device to said discharge port;

means disposed between said purification device and said inlet port for exposing to fresh air an upper surface of water flow from said water inlet port toward said purification device to increase oxygen content of said water flow and means for introducing said water flow into said purification device.

29. A purification apparatus of claim 28, wherein an air layer contacting directly to an air on a water surface of said water area is defined at an upper part of said fluidized bed filter tank.

30. A purification apparatus of claim 28, wherein said purification device comprises a group of purification parts linked together in series-arranged water paths and sharing an identical water intake or an identical water discharge.

31. A purification apparatus of claim 28, wherein a part of electric power used in said pump is an electric power generated by solar light electric generation.

32. A purification apparatus for placement in a water area to be purified, comprising:

a purification device for removing at least one of a pollution material and a specified material contained in said water area to be purified, said purification device being floatable on said water area to be purified and being so configured that discharged water from said water discharge port reaches an area remote from said water inlet port and that a relationship $N2<N0$ $N2<N1$, and $(N1-N2)/(N0-N2)>0.95$, is satisfied, where N0 is an average density of a target material to be removed by said purification apparatus and contained in raw water of said water area to be purified;

N1 is a density of a target material to be removed and contained in said raw water taken in from said water inlet port; and N2 is a density or a target material contained in a water discharged from said water discharge port;

a water inlet port for taking in said raw water in said water area to be purified and forwarding said raw water, to said purification device;

a water discharge port for feeding back said purified water processed in said purification device;

a pump located downstream of said purification device for discharging purified water from said purification device to said discharge port;

means disposed between said purification device and said inlet port for exposing to fresh air an upper surface of water flow from said water inlet toward said purification device to increase oxygen content of said water flow; and means for introducing said water flow into said purification device.

33. A purification apparatus of claim 32, wherein said purification device comprises a group of purification parts linked together in series-arranged water paths and sharing an identical water intake or an identical water discharge.

34. A purification apparatus of claim 32, wherein a part of electric power used in said pump is an electric power generated by solar light electric generation.

35. A purification apparatus comprising:

a water intake port for taking in raw water;

a filter container in which filter media for purifying said raw water taken in through said water inlet port are filled, said water intake port and a water discharge port for discharging said purified water being arranged in a horizontal direction and being connected to each other;

a pump located downstream of said filter container for discharging purified water from said filter container to said discharge port;

means between said filter container and said water intake port for exposing to fresh air an upper surface of said water flow to increase oxygen content of said water flow; and means for introducing said water flow into said filter container.

36. A purification method, comprising the steps of taking in water through a water intake port;

generating a water flow from said intake port to a means having an upper water surface for exposing said water flow to fresh air;

exposing said water flow to said fresh air;

filling a filter container with filter media for purifying said exposed water taken in through said water intake port;

placing said filter container inside a water area to which a purification operation is applied upstream of a pump; introducing the exposed water into said filter container to form purified water; and discharging purified water processed by said filter media with said pump.

* * * * *